United States Patent
Wakiyama et al.

(10) Patent No.: US 6,392,693 B1
(45) Date of Patent: May 21, 2002

(54) MONITORING VIDEO CAMERA APPARATUS

(75) Inventors: Koji Wakiyama; Kazutaka Higuchi, both of Yokohama; Haruo Kogane, Kawasaki, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/354,098

(22) Filed: Jul. 15, 1999

(30) Foreign Application Priority Data

Sep. 3, 1998 (JP) .......................................... 10-250079

(51) Int. Cl.$^7$ ................................................ H04N 7/13
(52) U.S. Cl. ........................ 348/143; 348/211; 348/373
(58) Field of Search ................................ 348/143, 211, 348/212, 213, 373; H04N 7/18

(56) References Cited

U.S. PATENT DOCUMENTS

| | | | | |
|---|---|---|---|---|
| 5,111,288 A | * | 5/1992 | Blackshear | 348/143 |
| 5,526,041 A | * | 6/1996 | Glatt | 348/143 |
| 5,627,616 A | * | 5/1997 | Sergeant et al. | 348/143 |
| 5,801,770 A | * | 9/1998 | Paff et al. | 348/211 |
| 5,923,364 A | * | 7/1999 | Rhodes et al. | 348/213 |
| 5,929,904 A | * | 7/1999 | Uchida | 348/211 |
| 5,963,250 A | * | 10/1999 | Parker et al. | 348/211 |
| 6,002,995 A | * | 12/1999 | Suzuki et al. | 348/211 |

FOREIGN PATENT DOCUMENTS

| | | |
|---|---|---|
| EP | 0532271 | 3/1993 |
| JP | 9-502331 | 3/1997 |
| WO | WO 9535624 | 12/1995 |

* cited by examiner

*Primary Examiner*—Howard Britton
(74) *Attorney, Agent, or Firm*—Connolly Bove Lodge & Hutz LLP

(57) ABSTRACT

A monitoring camera apparatus includes: a video camera; a panning mechanism; and a tilting mechanism; and automatic pivoting portion for operating the panning mechanism to pan the video camera by a predetermined pan (tilt) angle or to a predetermined pan (tilt) angle position when the video camera reaches the predetermined vertical (horizontal) position and a tilt command is inputted. The predetermined vertical position may be determined when the video camera directs the downward in the vertical direction. The auto-pivoting function may be started in response to both predetermined pan and tilt positions. During the auto-pivoting, controlling the video signal processing is stopped, pan and tilt speed is set to maximum, the direction of panning may be judged when the predetermined angle position is set. After auto-pivoting, tilt is made upwardly though the tilt command indicates downward and the screen image may be inverted and the pan and tilt positions are held until pan (tilt) command is inputted. The predetermined pan (tilt) angle and auto-pivoting mode set/reset may be set externally.

21 Claims, 3 Drawing Sheets

MONITORING VIDEO CAMERA APPARATUS

BACKGROUND OF THE INVENTION

1. Field of the Invention

This invention relates to a monitoring video camera apparatus for taking an image and outputting a video signal with tilt and pan control.

2. Description of the Prior Art

A monitoring video camera apparatus including a video camera and a tilting/panning mechanism for generating a video signal to provide a monitor image on a display monitor which is remote from the video camera is known.

International Publication Number WO 95/35624 discloses a surveillance camera system including such a prior art monitoring video camera apparatus. This surveillance camera system includes an auto-pivot feature for automatic pivoting of the camera when the camera is in a vertical position.

SUMMARY OF THE INVENTION

The aim of the present invention is to provide a superior monitoring video camera apparatus.

According to the present invention there is provided a first monitoring camera apparatus including: a video camera for taking an image around the video camera and generating a video signal from the image; a panning unit for panning the video camera in the horizontal direction in response to a pan command from an external controller; a tilting unit for tilting the video camera in the vertical direction in response to a tilt command from the external controller; a detector for detecting that the video camera reaches a predetermined vertical position of the video camera; and an automatic pivoting portion responsive to the tilt command and the detector for operating the panning unit to pan the video camera by a predetermined pan angle when the video camera reaches the predetermined vertical position and the tilt command is inputted.

In the first monitoring camera apparatus, the tilt command includes a speed command and the automatic pivoting portion operates the panning unit to pan the video camera by the predetermined pan angle when the video camera reaches the predetermined vertical position, the tilt command is inputted, and the speed command indicates a speed higher than a predetermined speed.

The first monitoring camera apparatus, may further include a video camera control portion for controlling a video signal generating condition in accordance with a control signal, wherein the automatic pivoting portion operates the video camera control portion to hold the video signal generating condition while the automatic pivoting portion operates the panning unit to pan the video camera by the predetermined pan angle.

In the first monitoring camera apparatus, the automatic pivoting portion operates the panning unit at a maximum panning speed.

In the first monitoring camera apparatus, the automatic pivoting portion operates the tilting unit to tilt the video camera upwardly in response to that the automatic pivoting has panned the video camera by the predetermined angle.

The first monitoring camera apparatus may further include a video signal converting circuit for converting the video signal to invert an screen image of the video signal in response to the automatic pivoting unit.

In the first monitoring camera apparatus, the predetermined position is determined by that the video camera is just downwardly directed in the vertical direction by the tilting unit.

The first monitoring camera apparatus may further include a receiving and storing portion for receiving and storing angle data and the automatic pivoting portion operates the panning unit to pan the video camera by the predetermined pan angle determined by the angle data from the receiving and storing portion.

In the first monitoring camera apparatus, the predetermined pan angle is 180°.

In the first monitoring camera apparatus, the automatic pivoting portion keeps to stop the panning and tilting units when the automatic pivoting portion completes operating the panning unit to pan the video camera by the predetermined pan angle until both stop commands for the tilting unit and the panning unit are inputted.

The first monitoring camera apparatus may further include a receiving and storing portion for receiving and enable/disable data indicative of enabling and disabling the automatic pivoting portion, the automatic pivoting portion either operates or does not operate the panning unit to pan the video camera by the predetermined pan angle in accordance with the enable/disable data when the video camera reaches the predetermined vertical position and the tilt command is inputted.

According to the present invention there is also provided a second monitoring camera apparatus including: a video camera for taking an image around the same and generating a video signal from the image; a panning unit for panning the video camera in the horizontal direction in response to a pan command from an external controller; a tilting unit for tilting the video camera in the vertical direction in response to a tilt command from the external controller; a detector for detecting that the video camera reaches a predetermined vertical position of the video camera; and an automatic pivoting portion responsive to the tilt command and the detector for operating the panning unit to pan the video camera to a predetermined pan angle position when the video camera reaches the predetermined vertical position and the tilt command is inputted; and a judging portion for judging one of pan directions to provide a less panning angle from the present position and the predetermined angle position, wherein the automatic pivoting portion operates the panning unit to pan the video camera in the one of pan directions from the judging portion.

According to the present invention there is also provided a third monitoring camera apparatus including: a video camera for taking an image around the same and generating a video signal from the image; a panning unit for panning the video camera in the horizontal direction in response to a pan command; a horizontal detector for detecting that the video camera reaches a predetermined horizontal position of the video camera to generate a horizontal position detection signal; a tilting unit for tilting the video camera in the vertical direction in response to a tilt command; a vertical detector for detecting that the video camera reaches a predetermined vertical position of the video camera to generate a vertical position detection signal; and an automatic pivoting portion responsive to the tilt command, the pan command, the horizontal detector, and the vertical detector for operating the panning unit to pan the video camera by a predetermined pan angle and operating the tilting unit to tilt the video camera by a predetermined tilt angle when the video camera reaches a predetermined horizontal position of the video camera, the video camera reaches the predetermined vertical position of the video camera, the pan command is inputted, and the tilt command is inputted.

In the third monitoring camera apparatus, the tilt command includes a tilt speed command and the pan command includes a pan speed command and the automatic pivoting portion operates the panning unit to pan the video camera by the predetermined pan angle and operates the tilting unit to tilt the video camera by the predetermined tilt angle when the video camera reaches a predetermined horizontal position of the video camera, the video camera reaches the predetermined vertical position of the video camera, and the pan command and the tilt commands are inputted.

The third monitoring camera apparatus may further include a video camera control portion for controlling a video signal generating condition of the video camera in accordance with a control signal, wherein the automatic pivoting portion operates the video camera control portion to hold the video signal generating condition while the automatic pivoting portion operates the panning unit to pan the video camera by the predetermined pan angle and operates the tilting unit to tilt the video camera by the predetermined tilt angle.

In the third monitoring camera apparatus, the automatic pivoting portion operates the panning unit at a maximum panning speed and operates the tilting unit at a maximum tilting speed.

The third monitoring camera apparatus may further include a receiving and storing portion for receiving and storing angle data, wherein the automatic pivoting portion operates the panning unit to pan the video camera by the predetermined pan angle determined by the angle data from the receiving and storing unit.

In the third monitoring camera apparatus, the predetermined pan angle may be 180°.

In the third monitoring camera apparatus, the automatic pivoting portion may keep stopping the panning and tilting units when the automatic pivoting portion completes operating the panning unit to pan the video camera by the predetermined pan angle and completes operating the tilting unit to tilt the video camera by the predetermined tilt angle until both stop commands for the tilting unit and the panning unit are inputted.

The third monitoring camera apparatus may further include a receiving and storing portion for receiving and storing enable/disable data indicative of enabling and disabling the automatic pivoting portion, the automatic pivoting portion either operates or does not operate the panning unit to pan the video camera by the predetermined pan angle in accordance with the enable/disable data when the video camera reaches the predetermined vertical position and the tilt command is inputted.

According to the present invention there is further provided a fourth monitoring camera apparatus including: a video camera for taking an image around the same and generating a video signal from the image; a panning unit for panning the video camera in the horizontal direction in response to a pan command from an external controller; a tilting unit for tilting the video camera in the vertical direction in response to a tilt command from the external controller; a detector for detecting that the video camera reaches a predetermined vertical position of the video camera and to a predetermined horizontal position of the video camera; an automatic pivoting portion responsive to the tilt command and the detector for operating the panning unit to pan the video camera to a predetermined pan angle position when the video camera reaches the predetermined vertical position and reaches the predetermined horizontal position and the tilt command is inputted; and a judging portion for judging one of pan directions to provide a lower panning angle from the the predetermined horizontal position and the predetermined pan angle position, wherein the automatic pivoting portion operates the panning portion to pan the video camera in the one of pan directions from the judging portion.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described a first embodiment of this invention.

Figure 1:
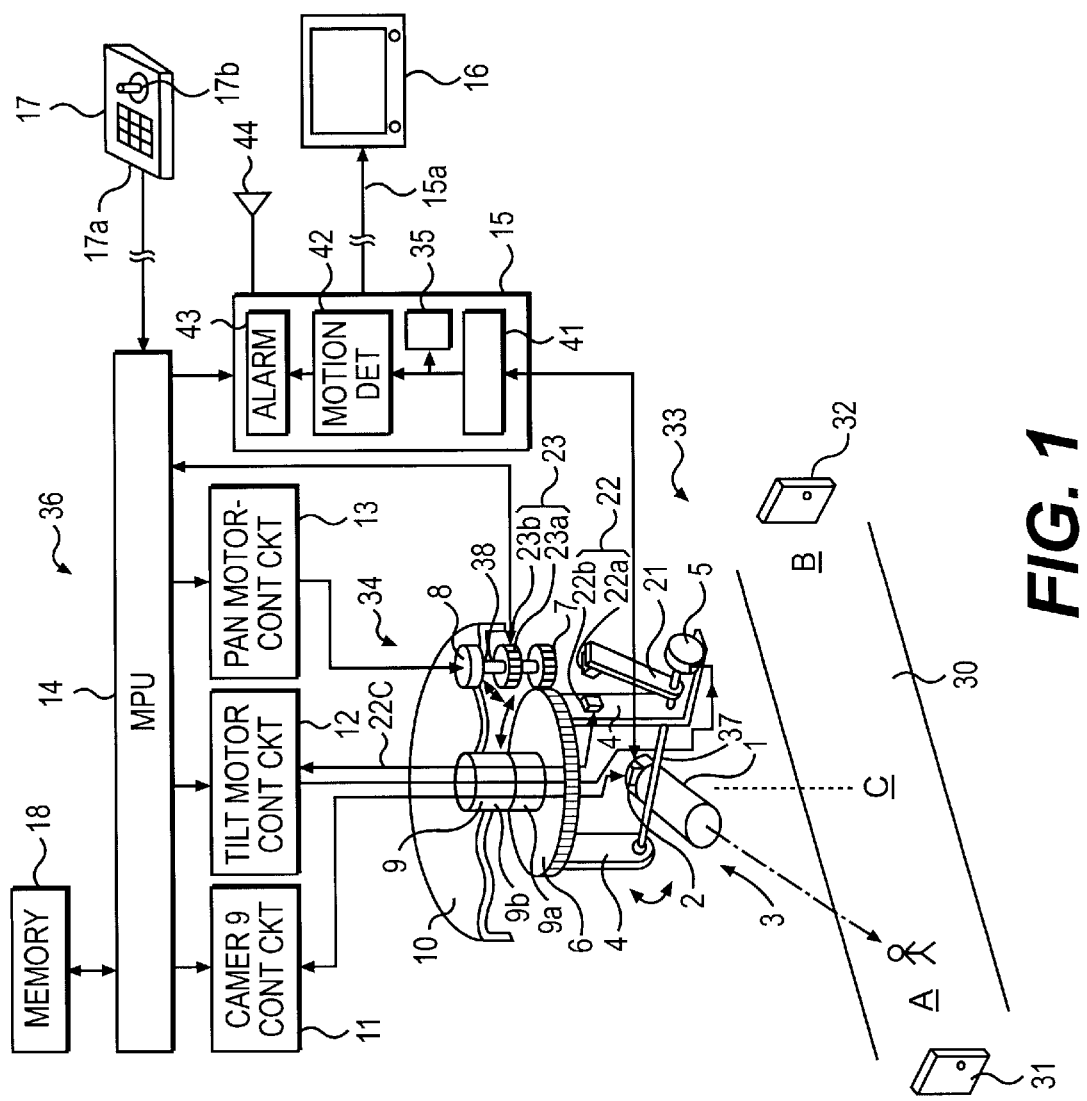
FIG. 1 is a block diagram of a video monitoring system including a video camera apparatus of the first embodiment.

FIG. 1 is a block diagram of a video monitoring system including a video camera apparatus of the first embodiment.

The video monitoring system includes a video camera apparatus 36 for taking an image around the same and generating a video signal, a display monitor 16, and a controller 17 for generating a command supplied to the video camera apparatus.

The monitoring video camera apparatus 36 of the first embodiment includes a camera unit 3, a tilting unit 33 for tilting the camera unit 3, a pan unit 34 for panning the camera unit through the tilting unit 33, a camera control circuit 11 for controlling the camera unit 3, a tilt motor control circuit 12, a pan motor control circuit 13, a microprocessor 14 (MPU), a video signal processing circuit 15 for processing an image signal from the camera unit 3 and generating a video signal, and a memory 18 for storing data.

The camera unit 3 includes a zoom lens unit 1 and a CCD image sensor 2. The zoom lens unit 1 receives the image and forms the image on the CCD image sensor 2 which generates the image signal supplied to the video signal processing circuit 15 which processes the image signal and generates the video signal 15a supplied to the display monitor 16 which provides a reproduced video image to a monitoring operator.

The camera control circuit 11 generates camera control signals to drive the CCD image sensor 2 and control a zoom ratio, a diaphragm. Similarly, the microprocessor 14 also generates video control signal supplied to the video signal processing circuit 15 such as white balance, gradation compensation, AGC, a motion detection, alarm generation, or the like.

The panning unit 34 includes a pan motor 8, a drive gear 7, a pan gear 6, arms 4, and a base plate 10. The pan motor control circuit 13 controls the pan motor 8. The pan motor 8 drives the pan gear 6 through the drive gear 7. The pan gear 6 supports the arms 4 which support the tilting unit 33. The base plate 10 supports the pan motor 8 and rotatably supports the pan gear 6.

The tilting unit 33 tilts the camera unit 3 and includes a tilt motor 5 supported by the arm 4 for rotating a shaft 37 which is supports the camera unit 3. The tilt motor control circuit 12 drives the tilt motor 5 under control by the microprocessor 14.

The video signal processing circuit 15 includes a video signal generation circuit 41 for generating the video signal from an image signal from the image sensor 2, a memory circuit 35 for storing the video signal from the video signal generation circuit 41 and reading the stored video signal to provide the output video signal 15a of which screen image is made a usual screen image, a mirror image, upside-down image, or a screen image inverted in the horizontal and vertical under control by the microprocessor 14, a motion detection circuit 42 for detecting a motion in the screen image between the present image and the past image, and an alarm circuit 43 responsive to the motion detection circuit 42 for generating an alarm signal when a motion is detected under the control by the microprocessor 14. The alarm signal is sent to the monitoring side, that is, a speaker 44 or the like to inform the alarm to the monitoring operator. As mentioned above, the microprocessor 14 generates the video control signal supplied to the video signal processing circuit 15 to control white balance, gradation compensation, AGC in the video signal generation circuit 41 and a motion detection in the motion detection circuit 42, the alarm generation in the alarm circuit 43.

The microprocessor 14 controls the camera control circuit 11, a tilt motor control circuit 12, the pan motor control circuit 13, and the video signal processing circuit 15 in response to the commands from the controller 17.

An arm 21 is fixed to an tilt axis 37 coupled to the tilt motor 5. An end of the arm 21 supports a magnet 22a. On the other hand, one of the arms 4 supports a Hall element 22b which is arranged to confront the magnet 22a at a predetermined vertical position. The magnet 22a and the Hall element 22b forms a vertical position sensor 22. The arm 21 is fixed such that the magnet 22a confronts the Hall element 22b when the camera unit 3 downwardly directs to the vertical direction C. This position is referred to as an auto-pivoting start position. The detection signal 22c is supplied to the microprocessor 14 through the tilt motor control circuit 12.

A slip ring 9 transmits signals between the camera control circuit 11 and the camera unit 3, between the tilt motor control circuit 12 and the tilt motor 5, between the vertical position sensor 22 and the microprocessor 14 through the tilt motor control circuit 12 to provide 360° panning.

A shaft 38 coupling the pan motor 8 to the drive gear 7 holds a magnetic gear 23a having teeth generating a magnetic field distribution pattern of which intensity of the magnetic field equi-angularly varies along the peripheral of the magnetic gear 23a to provide the panning angle. The base plate 10 supports a magnetic pickup 23b for detecting a magnetic field of the magnetic filed distribution pattern. A current is induced in the magnetic pickup 23b in response to confronting each tooth of the magnetic gear 23a as a horizontal position signal supplied to the microprocessor 14. The microprocessor 14 counts the pulses in the horizontal position signal to detect the panning angle and the pan angle position.

The monitoring operator operates the controller 17 with watching the display monitor 16. If a person walks on the passage from the door 31 to the door 32, the monitoring operator directs the camera unit 3 to the door 31 by operating the joystick 17b and directs an optical axis of the camera unit 3 to the person waking on the passage 30 by joystick 17b with controlling the tilt motor 5 and the pan motor 8. The operator can sets the automatic pivoting function by sending mode data indicative of a 180°-automatic panning mode, a desired angle panning mode with desired angle data or a desired angle position mode with desired angle position data to the microprocessor 14. The microprocessor 14 receives and stores the mode data and the accompanied data in the memory 18 and effects one of the automatic pivoting modes in accordance with the mode data in the memory 18.

Figure 2:
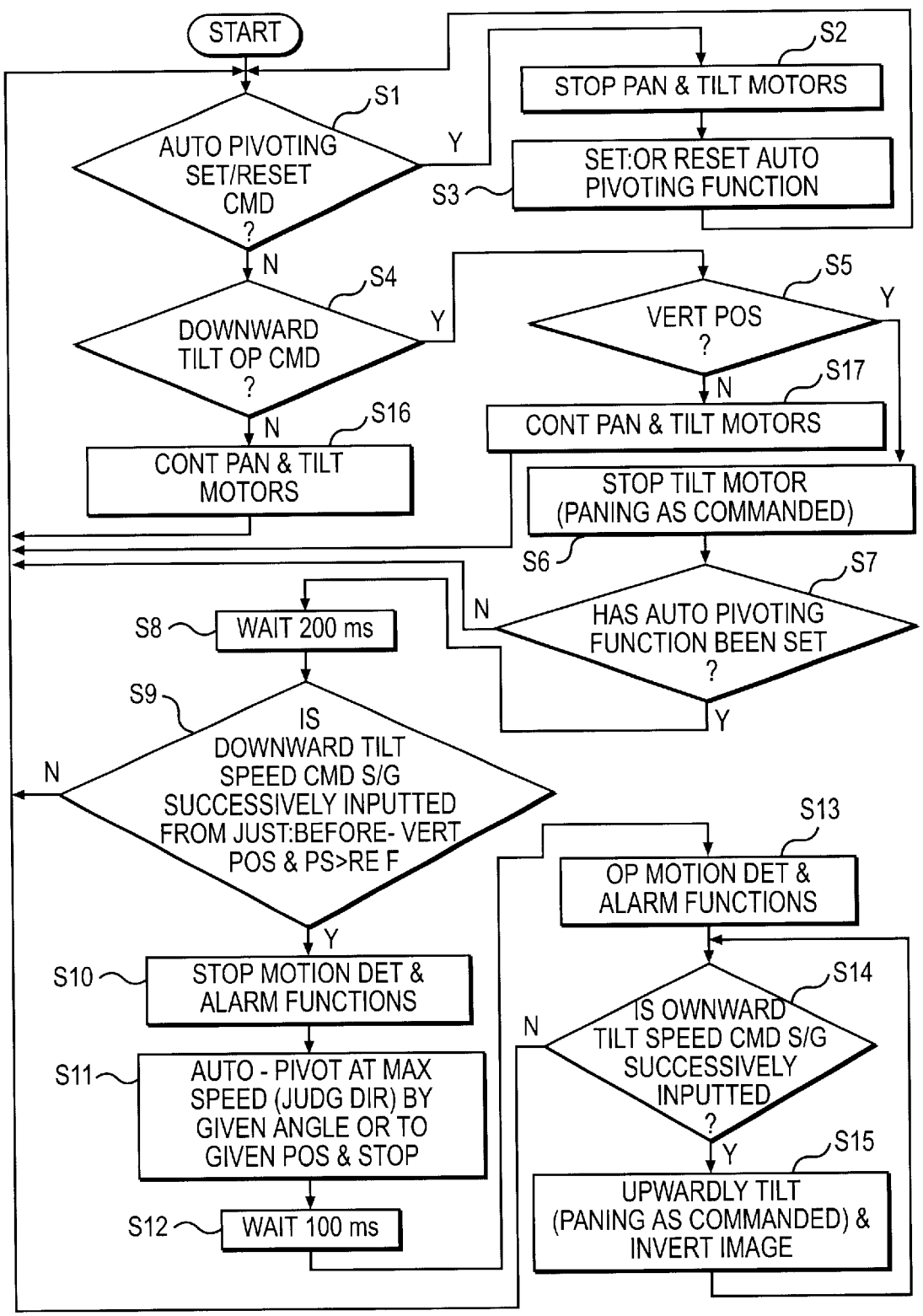
FIG. 2 depicts a flow chart of the first embodiment showing an operation of a microprocessor shown in FIG. 1.

FIG. 2 depicts a flow chart of the first embodiment showing the operation of the microprocessor 14.

The controller 17 generates and transmits the command in response to operation keys 171 and a joystick 17b.

The microprocessor 14 effects the operation shown in FIG. 2 in response to the command from the controller 17.

At first, the microprocessor 14 checks whether there is the automatic pivoting set/reset (enable/disable) command from the controller 17. If there is the automatic pivoting set/reset command from the controller 17 the microprocessor 14 stops the pan motor 8 and the tilt motor 5 in step s2. Then, if the automatic pivoting function has been reset, the microprocessor 14 sets the automatic pivoting function in step s3. If the automatic pivoting function has been set, the microprocessor 14 resets the automatic pivoting function in step s3 in response to the automatic pivoting set/reset command.

In step s1, if there is not the automatic pivoting set/reset command from the controller 17, the microprocessor 14 checks whether there is downward tilt operation command in step s4. If there is not a downward tilt operation command in step s4, the microprocessor 14 controls the pan motor 8 and the tilt motor 5 in step s16. If there is the downward tilt operation command in step s4, the microprocessor 14 checks whether the vertical position sensor 22 detects the vertical position in step s5. If the vertical position sensor 22 does not detect the predetermined vertical position, the microprocessor 14 controls the pan motor 8 and the tilt motor 5 in accordance with the pan speed command and the tilt speed command respectively included in the pan operation command and the tilt operation command from the controller 17 in step s17. If the vertical position sensor 22 detects the predetermined vertical position, the microprocessor 14 stops the tilt motor 5 but controls the pan motor 8 in accordance with the pan speed command in step s6. Then, the microprocessor 14 checks whether setting the automatic pivoting function (enable) has been maintained in step s7. If setting the automatic pivoting function has been not maintained (disable), processing returns to step s1. If setting the automatic pivoting function is maintained (enable), the microprocessor 14 waits for 200 m sec in step s8.

In the following step s9, the microprocessor 14 checks whether the tilt speed command indicating downward direction is successively inputted from just before the predetermined vertical position. If the tilt speed command indicating downward direction is not successively inputted from just before the vertical position, processing returns to step s1. If the tilt speed command indicating downward direction is successively inputted from just before the predetermined vertical position, the microprocessor 14 stops (disable) the motion detection and alarm functions or the like in step s10.

In the following step s11, the microprocessor 14 operates the pan motor control circuit 13 to pan the camera unit 3 by a predetermined pan angle (to a predetermined pan angle position in accordance with the mode data) with observing the output of the horizontal position sensor 23 and then stops the pan motor 8. Then, the microprocessor 14 waits for 100 msec in step s12.

In the following step s13, the microprocessor 14 operates (enables) the motion detection function and the alarm output functions or the like. Then, the microprocessor 14 checks whether the tilt speed command indicating downward direction is successively inputted. If the tilt speed command indicating downward direction is not successively inputted, processing returns to step s1. If the tilt speed command indicating downward direction is successively inputted, the microprocessor 14 operates the tilt motor control circuit 12 to upwardly tilt the camera unit 3 at a predetermined tilting speed, wherein panning is effected as commanded. Moreover, the video screen image is inverted by the video signal processing circuit 15 with the memory circuit 35. Then, processing returns to step s14. In step s14, if the tilt speed command indicating downward direction is successively inputted, the microprocessor 14 continues the operation in step s15. If the tilt speed command indicating downward direction is not successively inputted, processing returns to step s1.

In step s11, if mode data indicating the 180°-automatic panning mode is stored in the memory 18, the microprocessor 14 pans the video camera by 180°, and if mode data indicating the desired angle panning mode is stored in the memory 18, the microprocessor 14 pans the video camera by the desired angle in accordance with the desired angle data from the memory 18. Moreover, if the mode data indicating the desired angle position mode is stored in the memory 18, the microprocessor 14 pans the video camera to the desired angle position in accordance with the desired angle position data from the memory 18.

If the memory 18 stores the mode data indicating the 180°-automatic panning mode or a desired angle panning mode is stored in the memory 18, the microprocessor 14 pans the video camera unit 3 at a maximum panning speed. If the memory 18 stores the mode data indicating the desired angle position mode, the microprocessor 14 judges one of panning directions to provide a smaller panning angle and a short panning interval from the present pan angle position (the auto-pivoting start position) and the desired angle position data. Then, the microprocessor 14 operates the panning unit 34 to pan the video camera unit 3 in the judged pan direction in step s11.

In step s15, the microprocessor 14 controls the video signal processing circuit 15 including the memory circuit 35 to invert the screen image of the video signal and outputs the video signal of which screen image is inverted. That is, the screen image is made upside down or made a mirror image, or inverted in the vertical and horizontal directions.

Second Embodiment

The video monitoring camera apparatus of a second embodiment is substantially the same as that of the first embodiment. The difference is that the auto-pivoting function is effected in response to the pan operation command, the tilt operation command, detection of a predetermined vertical position and detection of a predetermined horizontal position and the automatic tilting is further effected in addition to panning of the auto-pivoting function. That is, when the camera unit 3 is directed to the door 31, the auto-pivoting function including panning and tilting is performed. In the second embodiment, the memory 18 stores the mode data indicative of a first pan and tilt mode with predetermined pan angle data and predetermined tilt angle data or a second pan and tilt mode with predetermined pan angle return position data and predetermined tilt angle return position data.

Figure 3:
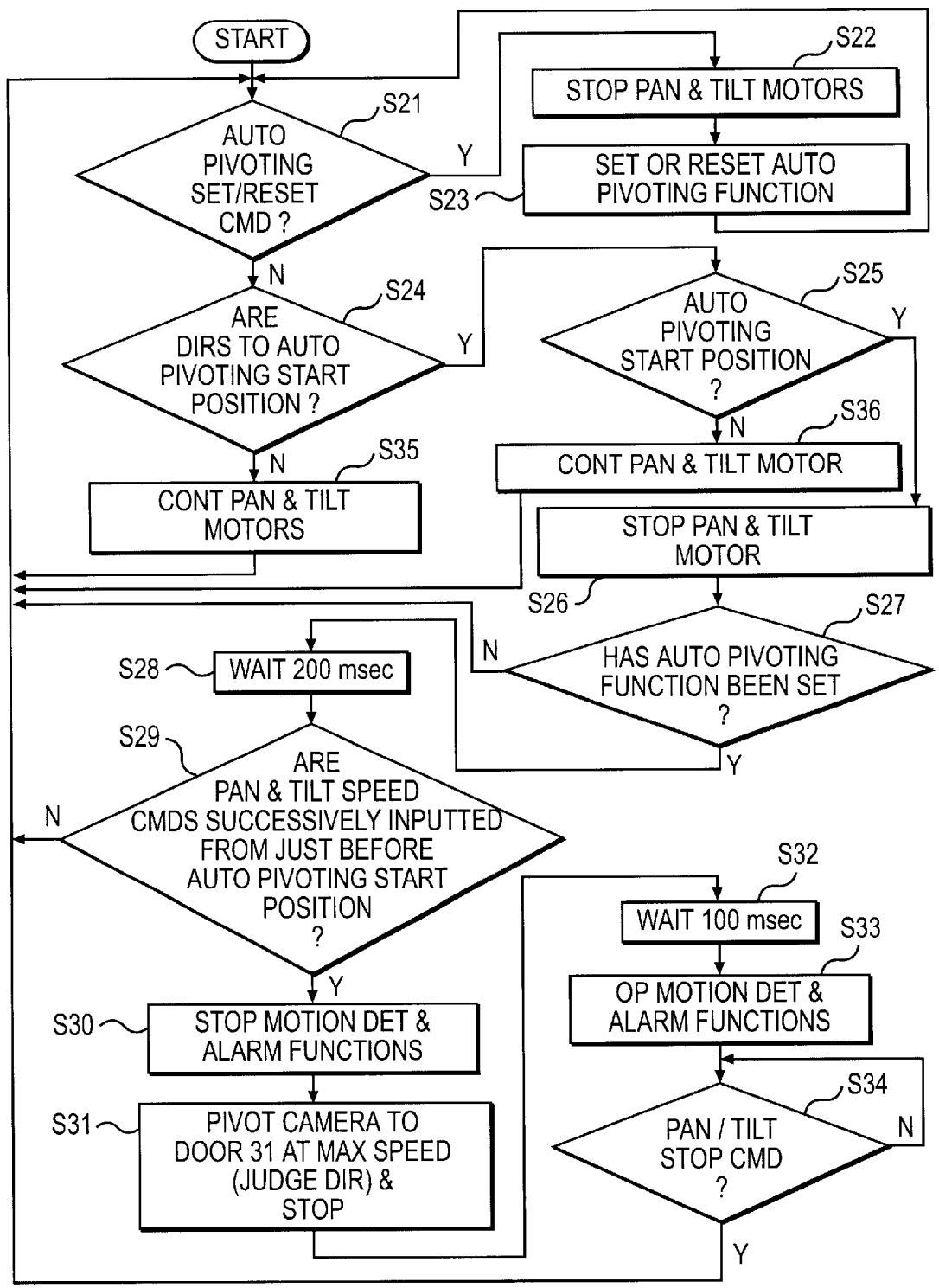
FIG. 3 depicts a flow chart of a second embodiment showing an operation of the microprocessor shown in FIG. 1.

FIG. 3 depicts a flow chart of the second embodiment showing the operation of the microprocessor 14.

The controller 17 generates and transmits the command in response to the operation keys 17a and the joystick 17b.

The microprocessor 14 effects the operation shown in FIG. 3 in response to the command from the controller 17.

At first, the microprocessor 14 checks whether there is the automatic pivoting set/reset (enable/disable) command from the controller 17 in step s21. If there is the automatic pivoting set/reset command from the controller 17 the microprocessor 14 stops the pan motor 8 and the tilt motor 5 in step s22. Then, if the automatic pivoting function has been reset, the microprocessor 14 sets the automatic pivoting function in step s23. If the automatic pivoting function has been set, the microprocessor 14 resets the automatic pivoting function in step s23.

In step s21, if there is not the automatic pivoting set/reset command from the controller 17, the microprocessor 14 checks whether the tilting unit 33 and the panning unit 34 are at auto-pivoting start position in step s24, that is, whether panning and tilting directions of the camera unit 3 indicated by the operation commands from the controller 17 are toward the auto-pivoting start position, i.e., toward the door 31. If the panning and tilting directions of the camera unit 3 indicated by the operation commands from the controller 17 are not toward the auto-pivoting start position in step s24, the microprocessor 24 controls pan and tilt motors 8 and 5 in accordance with the operation commands and the speed commands from the controller 17. If the panning and tilting directions of the camera unit 3 indicated by the operation commands from the controller 17 is toward the auto-pivoting start position in step s24, the microprocessor 24 checks whether the tilt unit 33 and the panning unit 34 are at the auto-pivoting start position in step s25.

Regarding the auto-pivoting start position, the relation between the vertical angle of the camera unit 3 and the arm 21 has been adjusted to direct to the camera unit 3 to the door 31 as a tilt angle start position. The auto-pivoting start position of the pan angle is set by storing the pan angle start position in the memory 18 in response to the command from the controller 17.

If the camera unit 3 is directed to the door 31 in step s25, the microprocessor 14 controls the pan motor 8 and the tilt motor 5 in step s26, the microprocessor 14 stops the tilt motor 5 and the pan motor 8 in step s26. Then, the microprocessor 14 checks whether setting the automatic pivoting function is maintained in step s27. If setting the automatic pivoting function is not maintained, processing returns to step s21. If setting the automatic pivoting function is maintained, the microprocessor 14 waits for 200 msec in step s28.

In the following step s29, the microprocessor 14 checks whether the tilt speed command and the pan speed command are successively inputted from just before the auto-pivoting start position. If the tilt speed command and the pan speed command are not successively inputted from just before the auto-pivoting start position, processing returns to step s21. If the tilt speed command and the pan speed command are successively inputted from just before the auto-pivoting start position, the microprocessor 14 stops (disable) the motion detection and alarm functions by the video signal processing circuit 15 in step s30.

In the following step s31, the microprocessor 14 operates the pan motor control circuit 13 to pan the camera unit 3 with observing the output of the horizontal position sensor 23 and the tilt motor control circuit 12 to tilt the camera unit 3 with observing the counts of the driving pulses for the tilt motor 5 and then stops the pan motor 8 and the tilt motor 5 when the camera unit 3 directs to the door 31, i.e., the optical axis of the camera unit 3 returns to the pan angle return position and returns to the tilt angle return position (the door 32). Then, the microprocessor 14 waits for 100 msec in step s32. In this step, if the first pan and tilt mode is set in the memory 18, the microprocessor 14 tilts and pans the camera unit 3 by the predetermined tilt angle data and the predetermined pan angle data. Moreover, if the second pan and tilt mode is set in the memory 18, the microprocessor 14 tilts the camera unit 3 to the tilt angle position determined by the predetermined tilt angle return data and pans the camera unit 3 to the pan angle position determined by the predetermined pan angle return data.

In the following step s33, the microprocessor 14 operates (enables) the motion detection function and the alarm output functions of the video signal processing circuit 15. Then, the microprocessor 14 checks whether the commands indicating stopping the pan motor 8 and the tilt motor 5 are inputted. If the commands indicating stopping the pan motor 8 and the tilt motor 5 are inputted by releasing the joystick 17b, processing returns to step s21. If the stop command indicating stopping the pan motor 8 and the tilt motor 5 are not inputted, processing waits the stop command and holds the tilt angle position and the pan angle position in step s34 to prevent mistake operation. This is because the monitoring operator may holds the inclined angle of the joy stick 17b though the auto-pivoting operation has completed due to the high speed auto-pivoting operation. In that case, if the tilt unit 33 or the pan unit 34 immediately respond the joystick 17b, the monitoring operator may miss the image of the door 32. Then, the tilt unit 33 and the pan unit 34 operates once a stop command is received after the auto-pivoting. That is, once the joystick 17b is released (at a rest position), the tilt unit 33 and the pan unit 34 start usual operation in step s34. The controller 17 sends the stop command to the microprocessor 14 when the inclined angle of the joystick 17b returns to zero.

In the auto-pivoting operation, the microprocessor 14 pans the video camera unit 3 at a maximum panning speed and at a maximum tilt speed. Moreover, in the second pan and tilt mode, the microprocessor 14 judges one of panning directions to provide a smaller panning angle and a shortest interval from the auto-pivoting start position of the pan angle position and the pan angle return position and tilt angle return position are stored in the memory 18. In the auto-pivoting operation, the microprocessor 14 operates the panning unit 34 to pan the video camera unit 3 in the judged pan direction in step s31.

What is claimed is:

1. A monitoring camera apparatus comprising:
    a video camera for taking an image around said video camera and generating a video signal from said image;
    panning means for panning said video camera in the horizontal direction in response to a pan command from an external controller;
    tilting means for tilting said video camera in the vertical direction in response to a tilt command from said external controller;
    detection means for detecting that said video camera reaches a predetermined vertical position of said video camera; and
    automatic pivoting means responsive to said tilt command and said detection means for operating said panning means to pan said video camera by a predetermined pan angle when said video camera reaches said predetermined vertical position and said tilt command is inputted.

2. A monitoring camera apparatus as claimed in claim 1, wherein said tilt command includes a speed command and said automatic pivoting means operates said panning means to pan said video camera by said predetermined pan angle when said video camera reaches said predetermined vertical position, said tilt command is inputted, and said speed command indicates a speed higher than a predetermined speed.

3. A monitoring camera apparatus as claimed in claim 1, further comprising video camera control means for controlling a video signal generating condition of said video camera in accordance with a control signal, wherein said automatic pivoting means operates said video camera control means to hold said video signal generating condition while said automatic pivoting means operates said panning means to pan said video camera by said predetermined pan angle.

4. A monitoring camera apparatus as claimed in claim 1, said automatic pivoting means operates said panning means at a maximum panning speed.

5. A monitoring camera apparatus as claimed in claim 1, wherein said automatic pivoting means operates said tilting means to tilt said video camera upwardly in response to that said automatic pivoting has panned said video camera by said predetermined angle.

6. A monitoring camera apparatus as claimed in claim 1, further comprising video signal converting means for converting said video signal to invert an screen image of said video signal in response to said automatic pivoting means.

7. A monitoring camera apparatus as claimed in claim 1, said predetermined position is determined by that said video camera is just downwardly directed by said tilting means.

8. A monitoring camera apparatus as claimed in claim 1, further comprising receiving and storing means for receiving and storing angle data, wherein said automatic pivoting means operates said panning means to pan said video camera by said predetermined pan angle determined by said angle data from said receiving and storing means.

9. A monitoring camera apparatus as claimed in claim 1, wherein said predetermined pan angle is 180°.

10. A monitoring camera apparatus as claimed in claim 1, wherein said automatic pivoting means keeps to stop said panning and tilting means when said automatic pivoting means completes operating said panning means to pan said video camera by said predetermined pan angle until both stop commands for said tilting means and said panning means are inputted.

11. A monitoring camera apparatus as claimed in claim 1, further comprising receiving and storing means for receiving and storing enable/disable data indicative of enabling and disabling said automatic pivoting means, said automatic pivoting means either operates or does not operate said panning means to pan said video camera by said predetermined pan angle in accordance with said enable/disable data when said video camera reaches said predetermined vertical position and said tilt command is inputted.

12. A monitoring camera apparatus comprising:
    a video camera for taking an image around the same and generating a video signal from said image;
    panning means for panning said video camera in the horizontal direction in response to a pan command from an external controller;
    tilting means for tilting said video camera in the vertical direction in response to a tilt command from said external controller;

detection means for detecting that said video camera reaches a predetermined vertical position of said video camera; and automatic pivoting means responsive to said tilt command and said detection means for operating said panning means to pan said video camera to a predetermined pan angle position when said video camera reaches said predetermined vertical position and said tilt command is inputted; and judging means for judging one of pan directions to provide a less panning angle from the present position and said predetermined angle position, wherein said automatic pivoting means operates said panning means to pan said video camera in said one of pan directions from said judging means.

13. A monitoring camera apparatus comprising:

a video camera for taking an image around the same and generating a video signal from said image;

panning means for panning said video camera in the horizontal direction in response to a pan command;

horizontal detection means for detecting that said video camera reaches a predetermined horizontal position of said video camera to generate a horizontal position detection signal;

tilting means for tilting said video camera in the vertical direction in response to a tilt command;

vertical detection means for detecting that said video camera reaches a predetermined vertical position of said video camera to generate a vertical position detection signal; and automatic pivoting means responsive to said tilt command, said pan command, said horizontal detection means, and said vertical detection means for operating said panning means to pan said video camera by a predetermined pan angle and operating said tilting means to tilt said video camera by a predetermined tilt angle when said video camera reaches a predetermined horizontal position of said video camera, said video camera reaches said predetermined vertical position of said video camera, said pan command is inputted, and said tilt command is inputted.

14. A monitoring camera apparatus as claimed in claim 13, wherein said tilt command includes a tilt speed command and said pan command includes a pan speed command and said automatic pivoting means operates said panning means to pan said video camera by said predetermined pan angle and operates said tilting means to tilt said video camera by said predetermined tilt angle when said video camera reaches a predetermined horizontal position of said video camera, said video camera reaches said predetermined vertical position of said video camera, and said pan command and said tilt commands are inputted.

15. A monitoring camera apparatus as claimed in claim 13, further comprising video camera control means for controlling a video signal generating condition of said video camera in accordance with a control signal, wherein said automatic pivoting means operates said video camera control means to hold said video signal generating condition while said automatic pivoting means operates said panning means to pan said video camera by said predetermined pan angle and operates said tilting means to tilt said video camera by said predetermined tilt angle.

16. A monitoring camera apparatus as claimed in claim 13, wherein said automatic pivoting means operates said panning means at a maximum panning speed and operates said tilting means at a maximum tilting speed.

17. A monitoring camera apparatus as claimed in claim 13, further comprising receiving and storing means for receiving and storing angle data, wherein said automatic pivoting means operates said panning means to pan said video camera by said predetermined pan angle determined by said angle data from said receiving and storing means.

18. A monitoring camera apparatus as claimed in claim 13, wherein said predetermined pan angle is 180°.

19. A monitoring camera apparatus as claimed in claim 13, wherein said automatic pivoting means keeps to stop said panning and tilting means when said automatic pivoting means completes operating said panning means to pan said video camera by said predetermined pan angle and completes operating said tilting means to tilt said video camera by said predetermined tilt angle until both stop commands for said tilting means and said panning means are inputted.

20. A monitoring camera apparatus as claimed in claim 13, further comprising receiving and storing means for receiving and storing enable/disable data indicative of enabling and disabling said automatic pivoting means, said automatic pivoting means either operates or does not operate said panning means to pan said video camera by said predetermined pan angle in accordance with said enable/disable data when said video camera reaches said predetermined vertical position and said tilt command is inputted.

21. A monitoring camera apparatus comprising:

a video camera for taking an image around the same and generating a video signal from said image;

panning means for panning said video camera in the horizontal direction in response to a pan command from an external controller;

tilting means for tilting said video camera in the vertical direction in response to a tilt command from said external controller;

detection means for detecting that said video camera reaches a predetermined vertical position of said video camera and to a predetermined horizontal position of said video camera;

automatic pivoting means responsive to said tilt command and said detection means for operating said panning means to pan said video camera to a predetermined pan angle position when said video camera reaches said predetermined vertical position and reaches said predetermined horizontal position and said tilt command is inputted; and judging means for judging one of pan directions to provide a lower panning angle from the said predetermined horizontal position and said predetermined pan angle position, wherein said automatic pivoting means operates said panning means to pan said video camera in said one of pan directions from said judging means.

* * * * *